United States Patent
Chan et al.

(10) Patent No.: US 10,359,747 B2
(45) Date of Patent: *Jul. 23, 2019

(54) CONTROLLING DEVICE, CONTROLLING SYSTEM AND CONTROLLING METHOD FOR INDOOR APPARATUS

(71) Applicant: DELTA ELECTRONICS, INC., Taoyuan (TW)

(72) Inventors: Cheng-Chieh Chan, Taoyuan (TW); Cheng-Yi Huang, Taoyuan (TW); Hsu-Fan Ai, Taoyuan (TW); Chien-Chung Lee, Taoyuan (TW); Yuan-Ping Hsieh, Taoyuan (TW); Jo-Fang Wei, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,147

(22) Filed: Jun. 22, 2018

(65) Prior Publication Data

US 2018/0299850 A1    Oct. 18, 2018

Related U.S. Application Data

(63) Continuation of application No. 14/540,086, filed on Nov. 13, 2014, now Pat. No. 10,088,817.

(30) Foreign Application Priority Data

May 8, 2014    (TW) .............................. 103116344 A

(51) Int. Cl.
   *G05D 23/19*    (2006.01)
   *F24F 11/00*    (2018.01)
   (Continued)

(52) U.S. Cl.
   CPC .............. *G05B 15/02* (2013.01); *F24F 11/30* (2018.01); *F24F 11/62* (2018.01);
   (Continued)

(58) Field of Classification Search
   CPC ............ G05B 15/02; G05B 2219/2642; G05B 2219/2614; F24F 11/30; F24F 11/62
   See application file for complete search history.

(56) References Cited

U.S. PATENT DOCUMENTS 8,127,563 B2 *   3/2012   Thiessen ............... F04B 35/045
                                                          417/12
8,146,053 B2     3/2012   Morrow et al.
(Continued)

FOREIGN PATENT DOCUMENTS

| CN | 101818933 | 9/2010 |
| TW | 200637999 | 11/2006 |
| TW | M443834   | 12/2012 |

OTHER PUBLICATIONS

Gao et al., SPOT: a smart personalized office thermal control system, 10 pages (Year: 2013).*

(Continued)

*Primary Examiner* — Thuy Dao
(74) *Attorney, Agent, or Firm* — Hauptman Ham, LLP

(57) ABSTRACT

A controlling device for indoor apparatus includes a detection module, a human machine interface (HMI) and a wireless transmission module. The controlling device accepts supervisor's setting for an indoor electronic apparatus via the HMI, detects the environment around the controlling device for generating a plurality of detection value via the detective module, and receives another detection value from a plurality of slave detection devices in same controlling system. The controlling device generates a control command based on setting parameter of the supervisor and the plurality of detection value, and transmits the
(Continued)

generated control command to the indoor electronic apparatus via the wireless transmission module. The indoor electronic apparatus works based on the received control command, so the environment around the controlling system can satisfy supervisor's demand.

14 Claims, 9 Drawing Sheets

(51) Int. Cl.
G05B 15/02 (2006.01)
G05D 23/00 (2006.01)
H04L 29/08 (2006.01)
H04L 12/64 (2006.01)
F24F 11/30 (2018.01)
F24F 11/62 (2018.01)
H04W 4/80 (2018.01)
F24F 11/56 (2018.01)

(52) U.S. Cl.
CPC ........ *H04L 12/6418* (2013.01); *H04L 67/125* (2013.01); *H04W 4/80* (2018.02); *F24F 11/56* (2018.01); *G05B 2219/2614* (2013.01); *G05B 2219/2642* (2013.01)

(56) References Cited

U.S. PATENT DOCUMENTS

| | | | |
|---|---|---|---|
| 8,554,376 B1 | 10/2013 | Matsuoka et al. | |
| 8,755,943 B2* | 6/2014 | Wenzel | G05F 1/66 700/276 |
| 8,892,264 B2* | 11/2014 | Steven | G06Q 50/06 700/286 |
| 8,924,034 B2* | 12/2014 | Deshpande | G05D 23/1924 700/291 |
| 9,020,647 B2* | 4/2015 | Johnson | F24F 11/30 700/277 |
| 9,104,211 B2* | 8/2015 | Fadell | G05D 23/1902 |
| 9,188,369 B2* | 11/2015 | Kuehl | F24F 3/1405 |
| 9,298,197 B2* | 3/2016 | Matsuoka | G05D 23/1917 |
| 9,347,694 B2* | 5/2016 | Wu | F25B 1/10 |
| 9,417,637 B2* | 8/2016 | Matsuoka | G05D 23/1904 |
| 9,424,005 B1 | 8/2016 | Avadhanula et al. | |
| 9,429,923 B2* | 8/2016 | Ward | G05B 15/02 |
| 9,443,041 B2 | 9/2016 | Shroff et al. | |
| 9,563,407 B2 | 2/2017 | Salter et al. | |
| 9,605,884 B2* | 3/2017 | Gomes | F25B 5/02 |
| 9,874,859 B1 | 1/2018 | Perzichilli | |
| 10,025,331 B2* | 7/2018 | Carter | G05D 23/1923 |
| 10,228,837 B2* | 3/2019 | Hua | G06F 3/04847 |
| 2012/0292997 A1 | 11/2012 | Lee et al. | |
| 2014/0278294 A1 | 9/2014 | Yeager et al. | |
| 2015/0372485 A1 | 12/2015 | Borean et al. | |
| 2016/0147920 A1 | 5/2016 | Goulkhah et al. | |
| 2016/0188769 A1 | 6/2016 | Aylott et al. | |

OTHER PUBLICATIONS

Parisio et al., Randomized Model Predictive Control for HVAC Systems, 8 pages (Year: 2013).*
Agarwal et al., Occupancy-driven energy management for smart building automation, 6 pages (Year: 2010).*
Copy of Office Action dated Jun. 7, 2016 from corresponding application No. TW 103116344.
Copy of Office Action dated Jul. 3, 2017 from corresponding application No. CN 201410192492.9.
Van-T-Klooster et al., Towards decision support for a home care services platform, Apr. 2012, 7 pages.
Sengul et al., Site-Specific Models for Realistic Wireless Network Simulation, Jan. 2015, 24 pages.

* cited by examiner

CONTROLLING DEVICE, CONTROLLING SYSTEM AND CONTROLLING METHOD FOR INDOOR APPARATUS

CROSS-REFERENCE TO RELATED APPLICATIONS

This application is a continuation application of U.S. application Ser. No. 14/540,086 filed on Nov. 13, 2014, which claims priority to TW103116344 filed May 8, 2014. The entire disclosure is incorporated herein by reference.

BACKGROUND OF THE INVENTION

1. Field of the Invention

The invention relates to a controlling device, controlling system and controlling method, and in particularly to controlling device, controlling system and controlling method of an indoor electronic apparatus.

2. Description of Related Art

Generally speaking, people always need to configure one or more indoor electronic apparatus inside of a house to adjust and keep circumstance conditions of the house in a most comfortable status.

FIG. 1 is a perspective view of remote control for a related art indoor electronic apparatus. As shown in FIG. 1, user can configure an air conditioner 11, a heat recover ventilator (HRV) 12 and an air circulator 13 inside of the house. The air conditioner 11 generates and delivers cold air/hot air to adjust indoor temperature, the HRV 12 exchanges indoor and outdoor air, and the air circulator 13 keeps balance of temperature around whole area.

However, the above mentioned indoor electronic apparatus are usually operated independently. For example, in FIG. 1, the air conditioner 11 can only be operated via an air conditioner remote control 110, the HRV 12 can only be operated via an HRV remote control 120, and the air circulator 13 can only be operated via an air circulator remote control 130. In other words, user is not permitted to control all indoor electronic apparatus through a single control interface directly.

Besides, current operation procedure of the indoor electronic apparatus is complicated. User should feel the air him or herself, and then operates the indoor electronic apparatus according to his or her own sensitivity, it may cause the uncertainty of the current operation procedure. Furthermore, the current operation procedure needs to adjust the working mode of the indoor electronic apparatus according to the sensitivity manually and continually (for example, adjusting temperature degree or airflow of the HRV 12) to keep the circumstance conditions in the most comfortable status. As a result, user may cause abrupt change of air quantity around the whole area and waste energy because of the inconvenience and the unfamiliarity about the current operation procedure.

SUMMARY OF THE INVENTION

The object of the present invention is to provide a controlling device, controlling system and controlling method for generating control command for an indoor electronic apparatus based on both of user setting and circumstance condition, so the indoor electronic apparatus can work in a most comfortable status and also satisfy user demand simultaneously.

The another object of the present invention is to provide a controlling device, controlling system and controlling method for providing a plurality of selectable situational models for a supervisor to choice, and generating the control command to the indoor electronic device based on both of parameters according to the selected situational model and detection value from the circumstance around the controlling device, the supervisor doesn't need to set and adjust working modes of the indoor electronic apparatus manually.

The controlling device of the present invention includes a detection module, a human machine interface (HMI) and a wireless transmission module. The controlling device accepts supervisor's setting for an indoor electronic apparatus via the HMI, detects the environment around the controlling device for generating a plurality of detection value via the detective module, and receives another detection value from a plurality of slave detection devices in same controlling system. The controlling device generates a control command based on setting parameter set by the supervisor and the plurality of detection value, and transmits the generated control command to the indoor electronic apparatus via the wireless transmission module. The indoor electronic apparatus works under the received control command, so the environment around the controlling system can always satisfy supervisor's demand.

Comparing with prior art, the present invention supports the supervisor to control all indoor electronic apparatus, such as indoor air conditioners, heat recovery ventilators, indoor air circulators, etc. via setting a single controlling device, it solves the problem of traditional remote control which can only use to control the indoor electronic device one by one.

Moreover, the controlling device of the present invention integrates multiple detection modules, and the controlling system of the present invention integrates the controlling device and multiple slave detection devices. Each of the detection modules and the detection devices is used to detect circumstance conditions and generate different kinds of detection value. The controlling device firstly generates the control command for the indoor electronic apparatus, and updates the control command continually based on the setting parameters set by the supervisor and the multiple generated detection value. Therefore, the indoor electronic apparatus can continually work under the demand of the supervisor without accepting any additional manual operation.

Besides, the controlling device of the present invention provides one or more selectable situational models for the supervisor to choose, and each of the one or more situational models is according to different one or more setting parameters. The controlling device controls and adjusts working modes of the indoor electronic apparatus based on the one or more setting parameters corresponding to the selected situational model. Therefore, the supervisor can operate and adjust the indoor electronic device to work in a suitable situation without any complicated setting procedure.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 2:
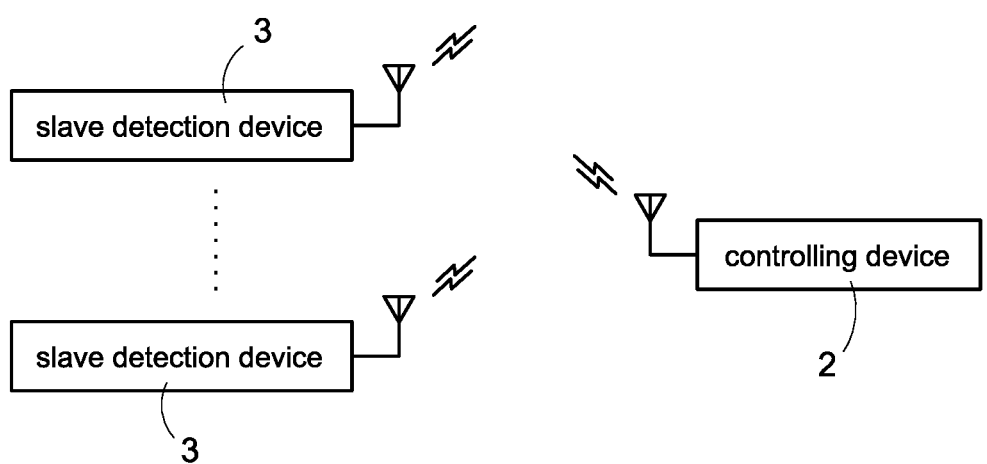
FIG. 2 is a perspective view of a first controlling system of a first embodiment according to the present invention.
Figure 3:
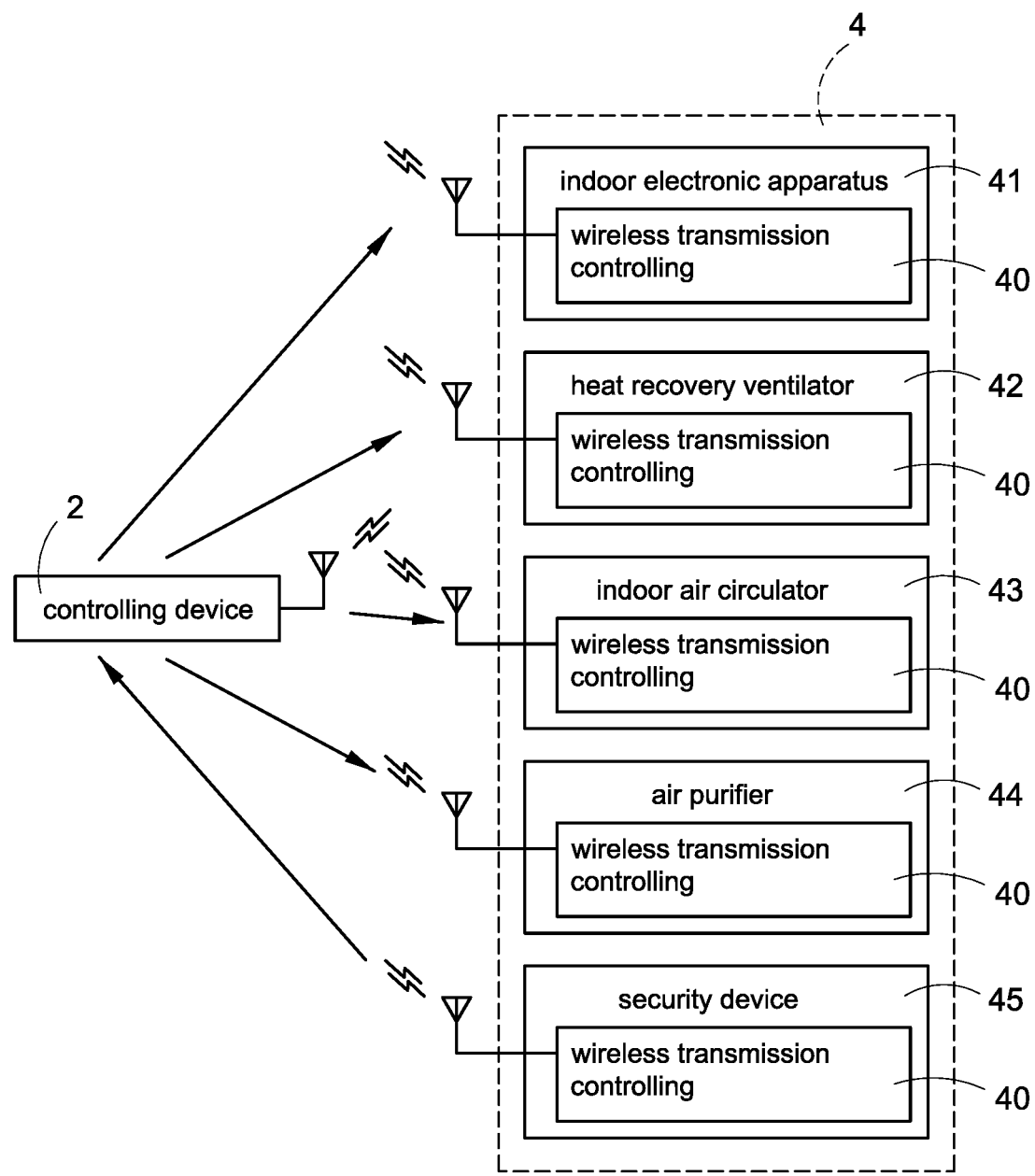
FIG. 3 is a perspective view of a second controlling system of the first embodiment according to the present invention.

FIG. 2 is a perspective view of a first controlling system of a first embodiment according to the present invention. FIG. 3 is a perspective view of a second controlling system of the first embodiment according to the present invention. As shown in FIG. 2 and FIG. 3, a controlling system for indoor electronic apparatus (referred to as the controlling system hereinafter) of the present invention mainly comprises a controlling device 2 for an indoor electronic apparatus (referred to as the controlling device 2 hereinafter), a plurality of slave detection devices 3 and at least one wireless transmission controlling device 40. The wireless transmission controlling device 40 is configured in an indoor electronic apparatus 4, and particularly, everyone indoor electronic apparatus 4 in this embodiment are respectively configured with one wireless transmission controlling device 40 therein. If there are multiple indoor electronic apparatus, then a plurality of wireless transmission controlling devices 40 is needed in the controlling system. The indoor electronic apparatus 4 shown in FIG. 3 is exemplified as an indoor air conditioner 41, a heat recovery ventilator (HRV) 42, an indoor air circulator 43, an air purifier 44, or a security device 45, but not intended to limit the scope of the present invention.

The controlling system is applied inside of a specific area such as a room or a building.

The plurality of slave detection devices 3 are respectively connected with the controlling device 2 wirelessly, and the plurality of wireless transmission controlling devices 40 are also wirelessly connected with the controlling device 2. Each of the plurality of slave detection devices 3 respectively detects circumstance condition of circumstance around itself, and generates one or more kinds of detection value to transmit to the controlling device 2.

On the other hand, a supervisor (as the supervisor 6 shown in FIG. 5) can operate the controlling device 2 and set one or more setting parameters. The controlling device 2 calculates the one or more setting parameters and the above-mentioned detection value and generates a control command. The control command is used to operate and adjust working modes of the indoor electronic apparatus 4. The controlling device 2 transmits the control command to the wireless transmission controlling device 40 in the indoor electronic apparatus 4. The indoor electronic apparatus 4 receives the control command through the wireless transmission controlling device 40 and applies a corresponding working mode based on the control command. Therefore, the indoor electronic apparatus 4 works in a most comfortable status, and satisfies the demand of the supervisor 6 simultaneously.

It should be mentioned that the circumstance conditions, such as temperature, humidity are varied after the indoor electronic apparatus 4 works. As a result, the plurality of slave detection devices 3 continually detects, generates and provides the detection value to the controlling device 2, and the controlling device 2 continually updates the control command based on the received detection value. Therefore, the indoor electronic apparatus 2 can adjust its working mode (for example, raises/reduces temperature of the indoor air conditioner 41, or adjusts airflow of the HRV 42) according to the updated control command without violating the demand of the supervisor 6 and keep the circumstance conditions always in a most comfortable status.

The controlling device 2 not only transmits the control command to the indoor electronic device 4, but also receives some information from the indoor electronic apparatus 4. As shown in FIG. 3, the indoor electronic apparatus 4 comprises, for example, the security device 45, such as an image monitoring device or a smoke sensor, etc. When detecting an event occur (for example, thick smokes are detected indoor), the security device 45 transmits related information to the controlling device 2. Therefore, the controlling device 2 updates the control command based on the received information, and operates the indoor electronic apparatus 4 to work in a corresponding working mode based on the updated control command. For instance, the controlling device 2 can operate the HRV 42 and the indoor air circulator 43 full on and set the airflow to highest airflow through the updated control command, so as to deliver the thick smokes as soon as possible.

Figure 4:
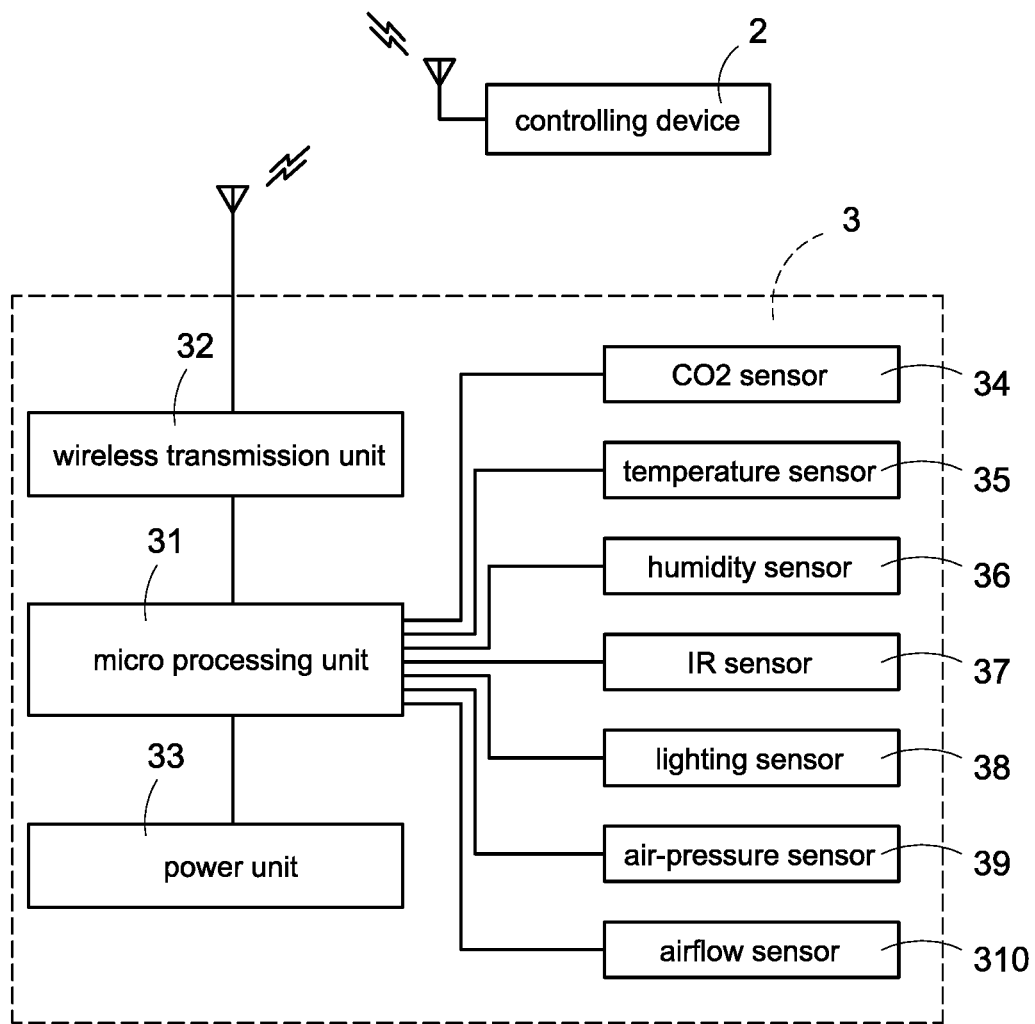
FIG. 4 is a block diagram of a slave detection device of a first embodiment according to the present invention.

FIG. 4 is a block diagram of a slave detection device of a first embodiment according to the present invention. Each of the plurality of slave detection devices 3 respectively comprises a micro processing unit 31, a wireless transmission unit 32, a power unit 33 and at least one sensor. The micro processing unit 31 is electrically connected to the wireless transmission unit 32, the power unit 33 and the at least one sensor, to process and integrate commands and signal of the wireless transmission unit 32, the power unit 33 and the at least one sensor.

The at least one sensor detects circumstance conditions around the slave detection device 3 and generates the detection value according to a detecting result. Content and amount of the detection value are corresponding to type and amount of the at least one sensor. In this embodiment, the at least one sensor of each of the plurality of slave detection devices 3 mainly comprises at least one of $CO_2$ sensor 34, temperature sensor 35, humidity sensor 36, IR sensor 37, lighting sensor 38, air-pressure sensor 39 and airflow sensor 310. The detection value generated by each of the at least one sensor comprises at least one of $CO_2$ value, temperature value, humidity value, radiant heat value, lighting value, air dirty degree value, and airflow value, but not limited thereto.

The power unit 33 is a power transferring unit or a battery to provide power to the slave detection device 3. The wireless transmission unit 32 is used to connect the slave detection device 3 with the controlling device 2 wirelessly, so the slave detection device 3 can transmit the detection value generated by the at least one sensor to the controlling device 2 through the wireless transmission unit 32. In this embodiment, the plurality of slave detection devices 3 respectively detects and generates the detection value continually, and reports the detection value to the controlling device 2 in a certain time or a certain period. Else, the plurality of slave detection devices 3 can also report the detection value to the controlling device 2 whenever a specific event occurs, such as one of the detection value beyond a threshold.

Figure 5:
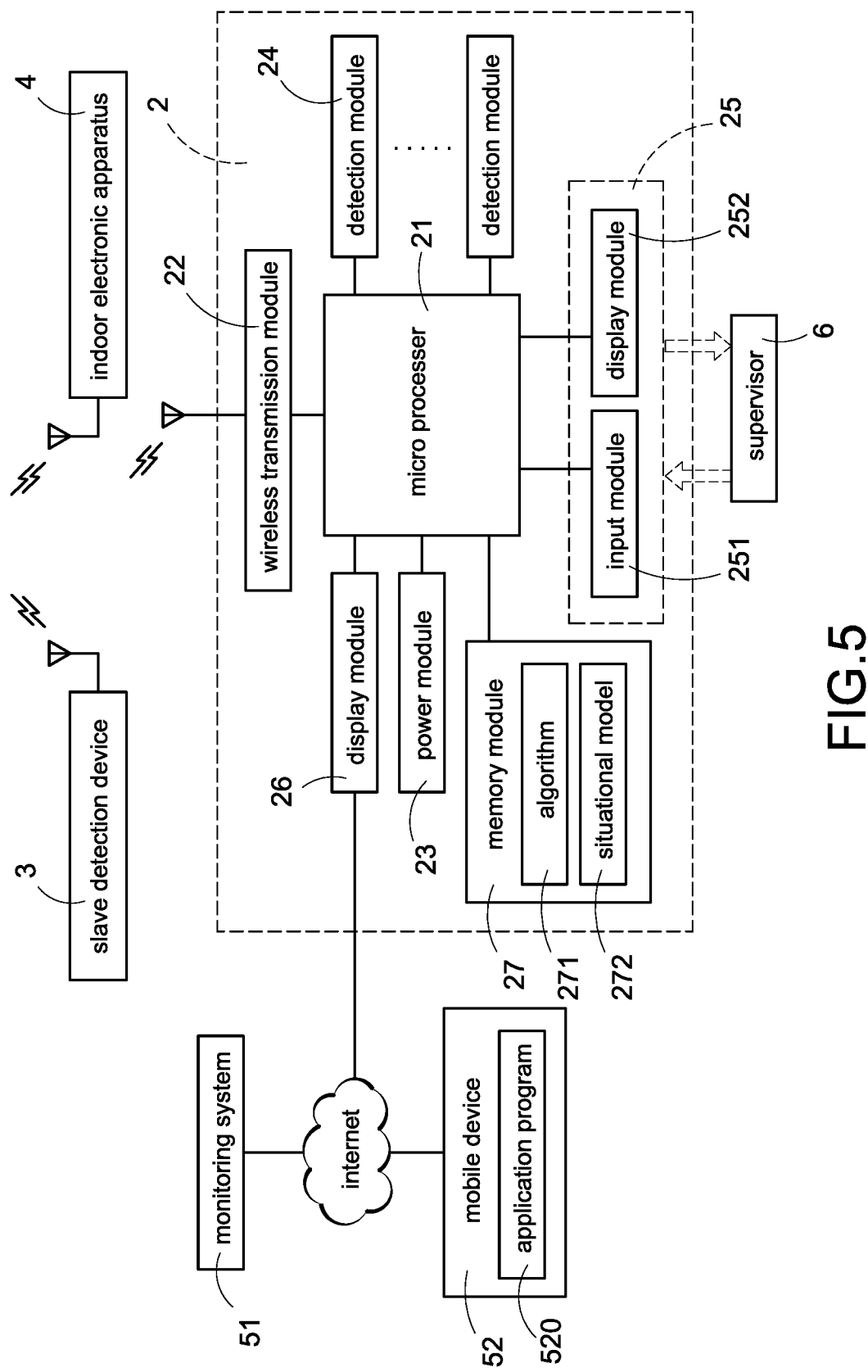
FIG. 5 is a block diagram of a controlling device of a first embodiment according to the present invention.

FIG. 5 is a block diagram of a controlling device of a first embodiment according to the present invention. The controlling device 2 mainly comprises a microprocessor 21, a wireless transmission module 22, a power module 23, a detection module 24, a human machine interface (HMI) 25, a remote connection module 26 and a memory module 27, wherein the microprocessor 21 is electrically connected to the wireless transmission module 22, the power module 23, the detection module 24, the HMI 25, the remote connection module 26 and the memory module 27.

In this embodiment, the controlling device 2 is one of the plurality of slave detection devices 3 which capable of controlling ability. In particularly, the controlling device 2 comprises one or more of the detection modules 24, the one or more detection modules 24 detect circumstance conditions around the controlling device 2, and generate one or more detection value based on the detecting result. Therefore, the controlling device 2 can generate the control command based on the detection value generated from both of the plurality of slave detection devices 3 and the detection module 24. As the same as the plurality of slave detection devices 3, the detection module 24 mainly comprises at least one of $CO_2$ sensor, temperature sensor, humidity sensor, IR sensor, lighting sensor, air-pressure sensor and airflow sensor. The detection value generated by the detection module 24 comprises at least one of $CO_2$ value, temperature value, humidity value, radiant heat value, lighting value, air dirty degree value, and airflow value, but not limited thereto.

The power module 23 is a power transferring unit or a battery to provide power to the controlling device 2.

The HMI 25 accepts operations of the supervisor 6, and generates one or more setting parameters based on the operation. It is to say, the content and the amount of the one or more setting parameters are according to the demand of the supervisor 6. For example, the supervisor 6 can turn the indoor air conditioner 41 on and set indoor temperature via the HMI 25. Another example, the supervisor 6 can also turn the indoor air circulator 43 on and set airflow of the air circulator 43 through the HMI 25. The controlling device 2 takes the content of the setting parameters as reference when generating the control command, so the indoor electronic apparatus 4 can work under the demand of the supervisor 6.

The HMI 25 shown in FIG. 5 is exemplified as an input module 251 and a display module 252. The supervisor 6 inquires the detection value and the operating status of the indoor electronic apparatus 4 upon the display module 252, and operates the controlling device 2 through the input module 251. The input module 251 mainly comprises at least one of keyboard, mouse, touchpad, imaging identified device, or voice inputting device. The display module 252 mainly comprises at least one of light emitting diode (LED) or liquid crystal display (LCD). In another embodiment, the HMI 25, however, can be implemented by a single touch screen, but not limited thereto.

The controlling device 2 establishes a wireless connection with the plurality of slave detection devices 2 through the wireless transmission module 22, and receives the detection value respectively from the plurality of slave detection devices 2. Also, the controlling device 2 establishes another wireless connection with the wireless transmission controlling device 40 through the wireless transmission module 22, and transmits the control command to the wireless transmission controlling device 40, so as to make the indoor electronic apparatus 4 works according to the control command.

The wireless transmission module 22 in this embodiment mainly comprises at least one of Wi-Fi transmission module, Bluetooth transmission module, Zigbee transmission module, or radio frequency (RF) transmission module. The controlling device 2 can comprise one or more wireless transmission modules 22 according to the transmission protocol used by the controlling system. In other words, the controlling device 2 can establish the wireless connection with the plurality of slave detection devices 3 and the wireless transmission controlling device 40 through single wireless transmission module 22 in the meanwhile, but it can also establish the wireless connection with the plurality of slave detection devices 3 and the wireless transmission controlling device 40 respectively through multiple wireless transmission modules 22, not intended to limit the scope of the present invention.

The indoor electronic apparatus 4 shown in FIG. 3 are exemplified as different types of electronic apparatus. For different types of the indoor electronic apparatus 4, the content of the control command generated by the controlling device 2 may be different in according to the content of the setting parameter and the detection value. For example, the content of the control command can be at least one of turning on/turning off the indoor electronic apparatus 4, operating rate adjustment, compressor operating frequency adjustment, temperature setting, airflow setting or working mode selection, but not limited thereto. When receiving the control command, the indoor electronic apparatus 4 can adjust its working mode based on the control command, so as to keep the circumstance around in a most comfortable status, and satisfy the demand of the supervisor 6 in the meanwhile.

The memory module 27 stores an algorithm 271, which is a firmware used to run specific program codes. The microprocessor 21 of the controlling device 2 executes the algorithm 271 based on the received setting parameters and the detection value, and the algorithm 271 generates the control command after calculating the setting parameters and the detection value. In other words, the algorithm 271 uses the setting parameters and the detection value to generate and optimize the control command.

For an instance, if the supervisor 6 sets indoor temperature to 25 degree through the controlling device 2, then the control command generated by the algorithm 271 is supposed to operate the indoor air conditioner 41 to work for adjusting indoor temperature to achieve the target of 25 degree. However, people generally feel colder when being in a high humidity circumstance, so if the content of the detection value indicates that the current humidity of the circumstance around is higher than standard humidity, the algorithm 271 may adjust the content of the control command based on the content of the detection value, and the adjusted control command possibly operate the indoor air conditioner 41 to work for adjusting the indoor temperature only to 26 degree. In this situation, the supervisor 6 can still feel 25 degree in the high humidity circumstance (even the indoor temperature is set to be 26 degree). As a result, it can satisfy the demand of the supervisor 6 and also save power of the control system in the meanwhile.

The remote connection module 28 is mainly used to connect the controlling device 2 with at least one outer device. As shown in FIG. 5, the controlling device 2 connects to internet through the remote connection module 26, and further connects with a monitoring system 51 through the internet. In this embodiment, the supervisor 6 operates the monitoring system 51 for inquiring information of the circumstance around the controlling system of the present invention, and further operates the controlling system remotely through the monitoring system 51. For example, the controlling system of the present invention can be configured in a room inside of a building, and the monitoring system 51 can be a central-controlling system of the building. In this embodiment, the remote connection module 26 is a RJ-45 connector for inserting a cable, and the controlling device 2 connects to the internet through the cable inserted in the RJ-45 connector. In other embodiment, the remote connection module 26 is a RS-485 connection port, and the controlling device 2 connects with the monitoring system 51 directly through the RS-485 connection port, but not limited thereto.

Furthermore, the supervisor 6 can also operate a mobile device 52 remotely, wherein the mobile device 52 is connected to the controlling device 2 through the internet by way of executing an application program 520 installed therein. The controlling system determines if the supervisor 6 of the mobile device 52 has a setting authority through verifying identification of the supervisor 6 or verifying a serial number of the executed application program 520. After the controlling system confirms that the supervisor 6 do have the setting authority, the supervisor 6 can operate the application program 520 of the mobile device 52 to set configurations of the controlling system remotely.

In the present invention, the memory module 27 mainly stores a plurality of situational models 272 for the supervisor 6 to select. The situational models 272 comprises, for example, meeting model, luncheon model, midday-rest model, etc. Each of the plurality of situational models 272 is configured in advance and according to one or more of the setting parameters. Therefore, the supervisor 6 selects one of the plurality of situational models 272 depending on actual demand, and the algorithm 271 applies the setting parameters corresponding to the selected situational model 271 to generate the control command. In this exercise, the supervisor 6 doesn't need to do any additional settings manually for the setting parameters, and the complicated setting procedure can be avoided.

For an instance, if the meeting model is selected, depending on the quiet demand of the meeting, the content of the control command for the indoor air conditioner 41 may comprises: (1). turns to air-conditioning mode, (2). set indoor temperature to 27 degree, (3). set airflow to low airflow; the content of the control command for the heat recovery ventilator 42 may comprises: (1). set recovery frequency to low frequency, (2). set airflow to low airflow; and the content of the control command for the indoor air circulator 43 may comprises: (1). set airflow to low airflow. For another instance, if the luncheon model is selected, because food smell is present during lunch, and temperature is easier raised when people get increased, and quietness is not so necessary during lunch time, the content of the control command for the indoor air conditioner 41 in this instance may comprises: (1). turns to air-conditioning mode, (2). set indoor temperature to 25 degree, (3). set airflow to high airflow; the content of the control command for the heat recovery ventilator 42 in this instance may comprises: (1). set recovery frequency to high frequency, (2). set airflow to high airflow; and the content of the control command for the indoor air circulator 43 in this instance may comprises: (1). set airflow to high airflow. However, above descriptions are just simple embodiments, not intended to limit the scope of the present invention.

Figure 1:
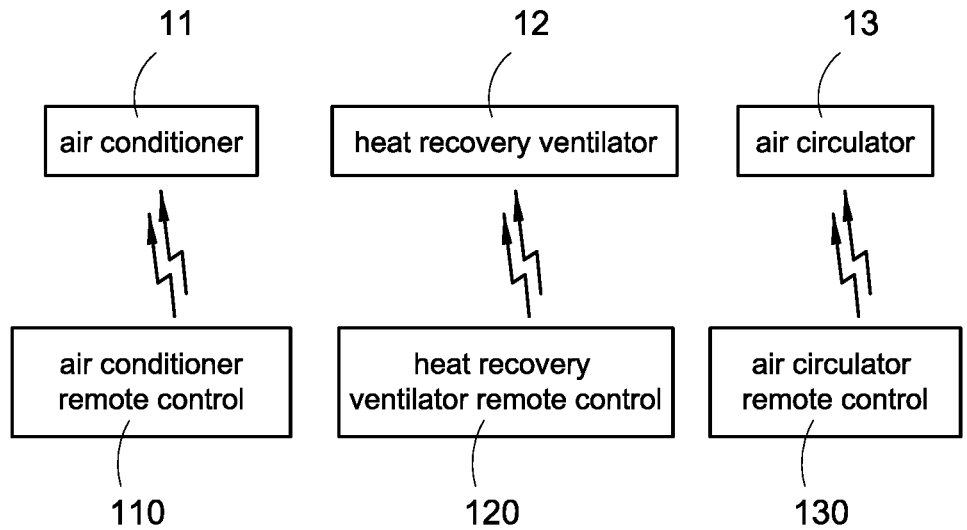
FIG. 1 is a perspective view of remote control for a related art indoor electronic apparatus.
Figure 6:
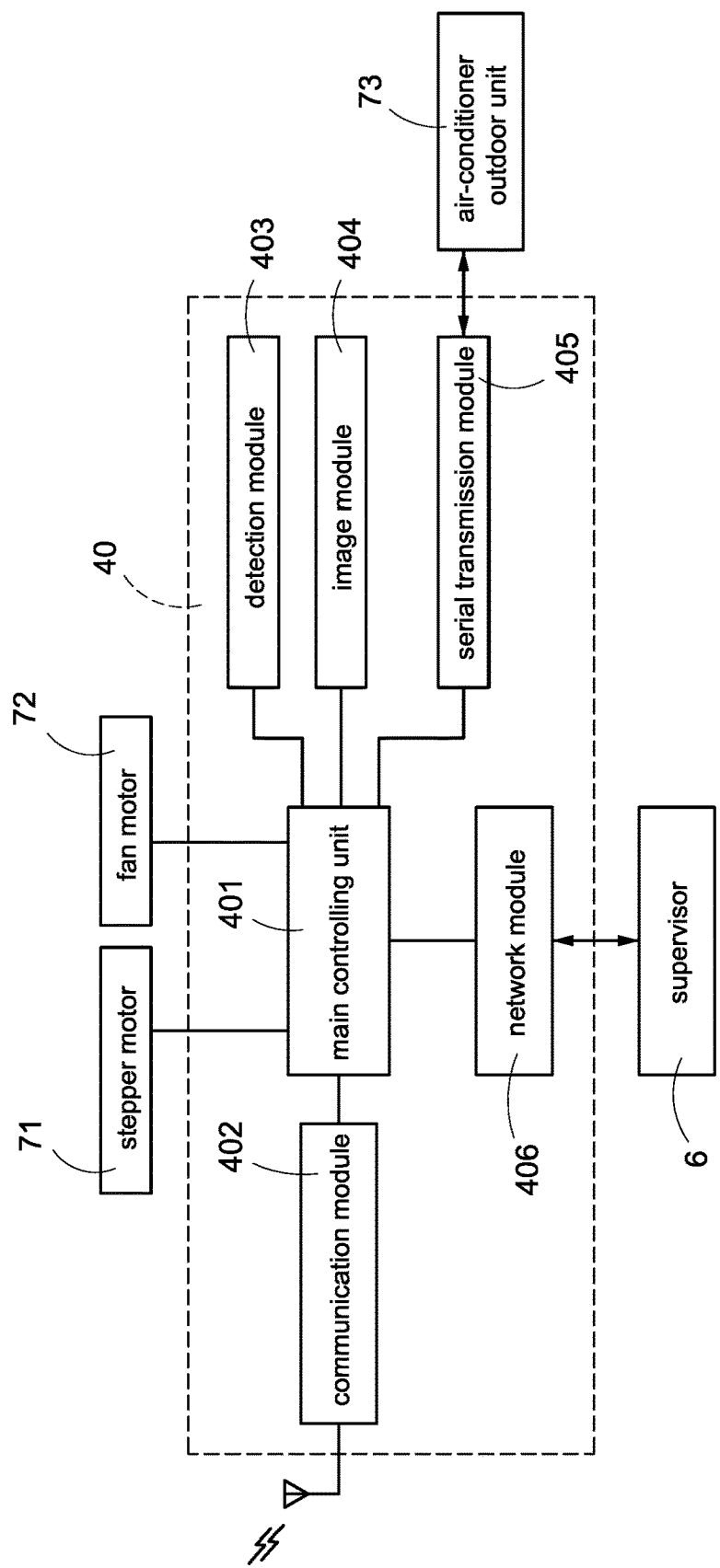
FIG. 6 is a block diagram of a wireless transmission controlling device of a first embodiment according to the present invention.

FIG. 6 is a block diagram of a wireless transmission controlling device of a first embodiment according to the present invention. FIG. 6 shows the indoor air conditioner 41, which comprises an independent controller (not shown), s stepping motor 71, a fan motor 72, etc., and the indoor air conditioner 41 is connected to an air-conditioner outdoor unit 73. The supervisor 6 basically uses the remote control shown in FIG. 1 to operate the indoor air conditioner 41. The wireless transmission controlling device 40 in this embodiment is embedded in the indoor air conditioner 41, for receiving the control command wirelessly from the controlling device 2. The indoor air conditioner 41 in this embodiment operates the stepping motor 71, the fan motor 72, the air-conditioner outdoor unit 73 and other internal components based on the received control command. Therefore, the indoor air conditioner 41 works in the most comfortable status in most economical way, and also satisfies the demand of the supervisor 6 in the meanwhile.

As shown in FIG. 6, the wireless transmission controlling device 40 mainly comprises a main controlling unit 401, a communication module 402, a detection module 403, an imaging module 404, a serial transmission module 405 and a network module 406, wherein the main controlling unit 401 is electrically connected with the communication module 402, the detection module 403, the imaging module 404, the serial transmission module 405 and the network module 406. The communication module 402 is used to establish the wireless connection with the controlling device 2, and receive the control command from the controlling device 2. The main controlling unit 401 operates the indoor air conditioner 41 based on the received control command. The network module 406 is used to connect with the internet, and in this embodiment, the supervisor 6 can operate the indoor air conditioner 41 via the internet without going through the controlling device 2.

The detection module 403 and the imaging module 404 simply detect the circumstance around the indoor air conditioner 41, and execute corresponding adjustment based on the detecting result. The serial transmission module 405 is used to connect with the air-conditioner outdoor unit 73 and transmit the control command (for example, compressor operating frequency adjustment) to the air-conditioner outdoor unit 73. Because of the existence of the wireless transmission controlling device 40, the indoor air conditioner 41 can be operated not only by way of the remote control, but also by way of the controlling device 2, the above-mentioned monitoring system 51 and the mobile device 52.

Figure 7:
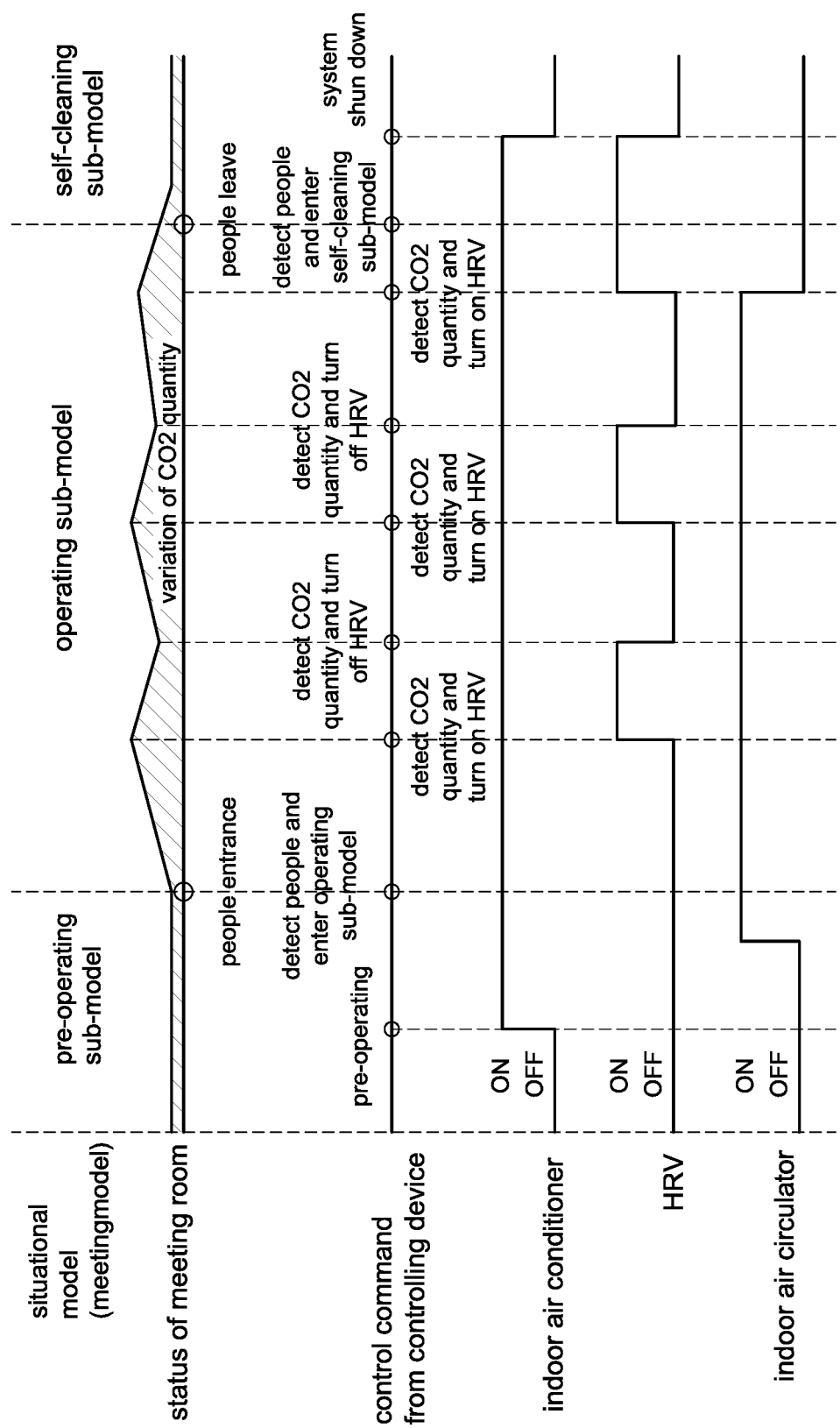
FIG. 7 is a perspective view of a situational model of a first embodiment according to the present invention.

FIG. 7 is a perspective view of a situational model of a first embodiment according to the present invention. The supervisor 6 can set the setting parameters through a manual operation on the HMI 25. Else, the supervisor 6 can also do a selection on the HMI 25 for selecting one of the plurality of situational models 272 provided by the controlling device 2, and the controlling device 2 uses the setting parameters corresponding to the selected situational model 272 to generate the control command.

In this embodiment, the selected situational model 272 (for example, the meeting model mentioned above) is mainly consisted of a pre-operating sub-model, an operating sub-model and a self-cleaning sub-model. The pre-operating sub-model is applied in a certain time period before a starting time of the selected situational model 272, the operating sub-model is applied between the starting time and an ending time of the selected situational model 272, and the self-cleaning sub-model is applied in another time period after the ending time of the selected situational model 272. In other embodiment, the selected situational model 272, however, can only be consisted of the operating sub-model and the self-cleaning sub-model. And in another embodiment, the selected situational model 272 can also be consisted of four or more than four sub-models, but not limited thereto.

In the embodiment shown in FIG. 7, the meeting model is selected as the selected situational model 272. After completing the selection, the controlling device 2 enters the pre-operating sub-model of the selected situational model 272 N minutes before the starting time, and applies the one or more setting parameters corresponding to the pre-operating sub-model of the selected situational model 272. Before the meeting starts, people not enter a meeting room yet, so $CO_2$ quantity in the meeting room is low. As a result, the controlling device 2 can only turn the indoor air conditioner 41 on and keep the HRV 42 and the indoor air circulator 43 off for saving power based on the applied setting parameters in the pre-operating sub-model. It should be mentioned that the purpose of the pre-operating sub-model is to adjust the circumstance condition around the meeting room in advance, so as to reduce the oppressive and hot feeling when people get into the meeting room.

At the starting time of the meeting, or when the plurality of slave detection devices 3 detect people entrance, the controlling device 2 enters the operating sub-model of the selected situational model, and applies the one or more setting parameters corresponding to the operating sub-model of the selected situational model 272. In this sub-model, the controlling device 2 adjusts the temperature of the indoor air conditioner 41 based on the applied one or more setting parameters of the operating sub-model and the detection value mentioned above. In the meanwhile, $CO_2$ quantity in the meeting room may increase because of people entrance, so the controlling device 2 can turn the HRV 42 and the indoor air circulator 43 on for exchanging indoor and outdoor air to deliver $CO_2$ in the meeting room. However, cold air/hot air will enter the meeting room because of indoor and outdoor air exchange. When the detection value indicates that the temperature of the meeting room is too low/high, the controlling device 2 may adjust the temperature of the indoor air conditioner 41 again and again based on the detection value. For the purpose of power saving, when the detection value indicates $CO_2$ quantity in the meeting room reduced and below a certain threshold, the controlling device 2 can turn the HRV 42 off or slow the operating rate of the HRV 42 based on the detection value.

Finally, at the ending time or when the plurality of slave detection devices 3 detect people all leave from the meeting room, the controlling device 2 enters the self-cleaning sub-model of the selected situational model 272. In this time, the controlling device 2 applies the one or more setting parameters corresponding to the self-cleaning sub-model of the selected situational model 272, and turns the indoor air circulator 43 off, and keeps the indoor air conditioner 41 and the HRV 42 to work in a certain mode that is suitable to clean up dirty air and unpleasant smell in the meeting room. The controlling device 2 operates the whole controlling system to shut down or enter a standby mode after completing every task.

Above description is just a preferred embodiment, but not intended to limit the scope of the present invention. The controlling device 2 in the present invention may provide multiple situational models 272 in different types for the supervisor 6 to select. Each type of the multiple situational models 272 is corresponding to different kinds and amount of the setting parameters, and is consisted of different amount of sub-models. Furthermore, each type of the multiple situational models 272 may turn on/turn off/adjust different kinds and amount of the indoor electronic apparatus 4.

Figure 8:
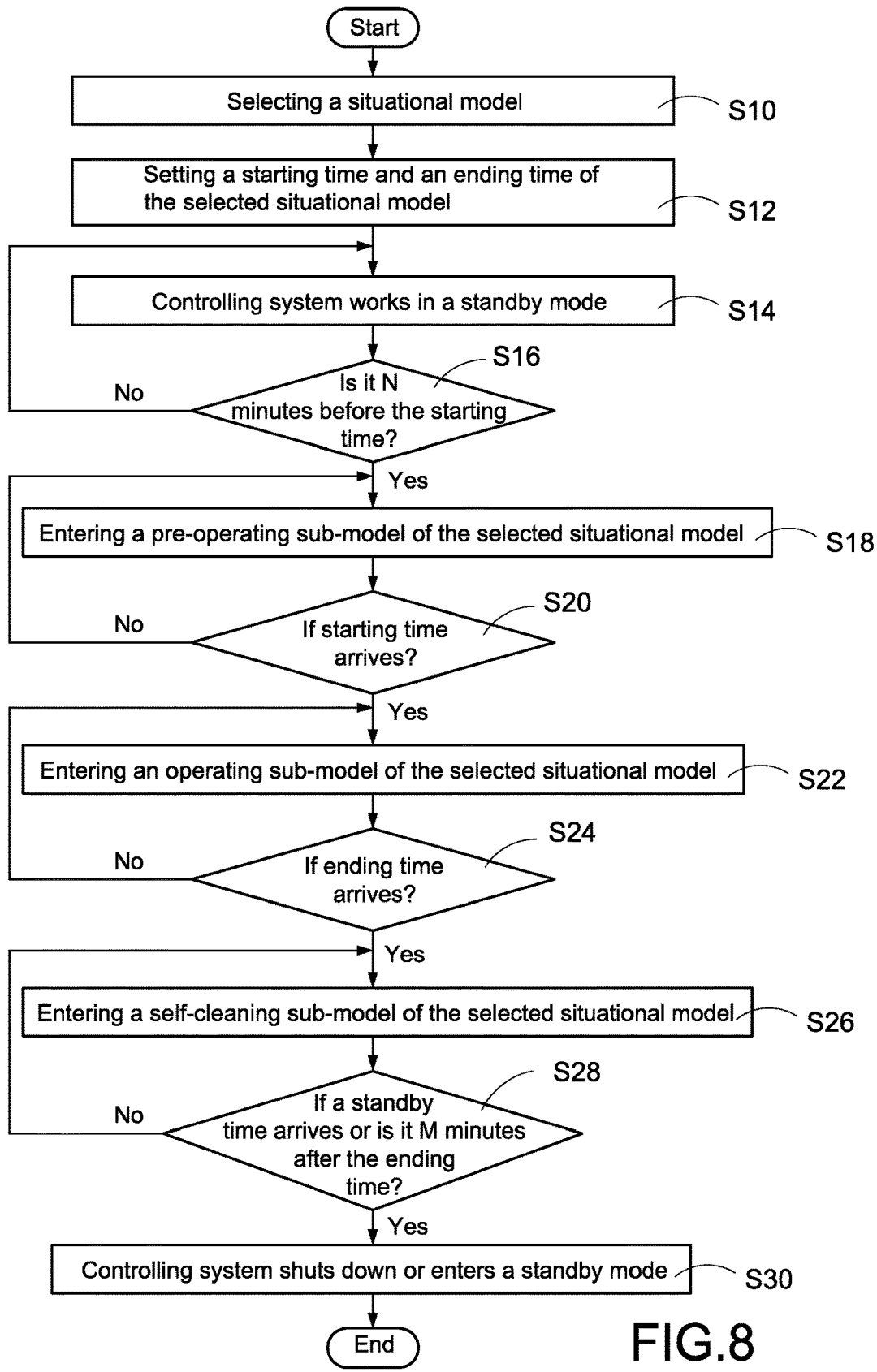
FIG. 8 is a flowchart of a situational model of a first embodiment according to the present invention.

FIG. 8 is a flowchart of a situational model of a first embodiment according to the present invention. First at all, the supervisor 6 do an operation on the HMI 25, the monitoring system 51 or the mobile device 52 to select one of the plurality of situational models 272 (step S10), and then set a starting time and an ending time of the selected situational model 272 (step S12).

Before the starting time, the controlling system of the present invention shut down or works in the standby mode (step S14). The controlling device 2 determines if it is N minutes before the starting time (step S16), if yes, the controlling device 2 enters the pre-operating sub-model of the selected situational model 272 (step S18), and if no, the controlling device 2 keeps working in the standby mode. The execution limitation of the step S16 depends on the setting parameters corresponding to the selected situational model 272, for example, the situational model 272 can be set without the pre-operating sub-model, or be set to enter the pre-operating sub-model at 15 minutes or 30 minutes before the starting time, but not limited thereto. After entering the pre-operating sub-model, the controlling device 2 generates the control command based on the detection value and the one or more setting parameter corresponding to the pre-operating sub-model of the selected situational model 272.

The purpose of the pre-operating sub-model is to let the circumstance gets ready in advance, and the circumstance condition can satisfy the demand of the supervisor 6 before the starting time arrives. After the step S18, the controlling device 2 continually determines if the starting time arrives (step S20). If the starting time does not arrive, the controlling device 2 keeps working in the pre-operating sub-model. If the starting time arrives, the controlling device 2 enters the operating sub-model of the selected situational model 272 (step S22). After the step S22, the controlling device 2 changes to apply the one or more setting parameters corresponding to the operating sub-model of the selected situational model 272, and generates the control command by way of calculating the detection value and the one or more setting parameters corresponding to the operating sub-model.

The purpose of the operating sub-model is to keep the circumstance condition satisfied the demand of the supervisor 6 in a certain time period set by the supervisor 6. For example, a quiet and comfortable circumstance is needed in the meeting model, a high air exchange for deliver indoor food smell is needed in the luncheon model, and the temperature needs to be adjusted from low temperature become high temperature in the midday-rest model. When entering the operating sub-model, the controlling device 2 continually determines if the ending time arrives (step S24), if no, the controlling device 2 keeps working in the operating sub-model, and if yes, the controlling device 2 enters the self-cleaning sub-model of the selected situational model 272 (step S26). After the step S26, the controlling device 2 changes to apply the one or more setting parameters corresponding to the self-cleaning sub-model of the selected situational model 272, and generates the control command by way of calculating the detection value and the one or more setting parameters corresponding to the self-cleaning sub-model.

The purpose of the self-cleaning sub-model is to recover the circumstance back to the status before usage, for example, to recover the temperature under standard or to clean up the indoor unpleasant smell completely. The controlling device 2 then determines if a standby time arrives, or if it is M minutes after the ending time (step S28). If yes following the step S28, the controlling device 2 operates the controlling system to shut down or enter the standby mode (step S30). If no following the step S28, the controlling device 2 keeps working in the self-cleaning sub-model.

Figure 9:
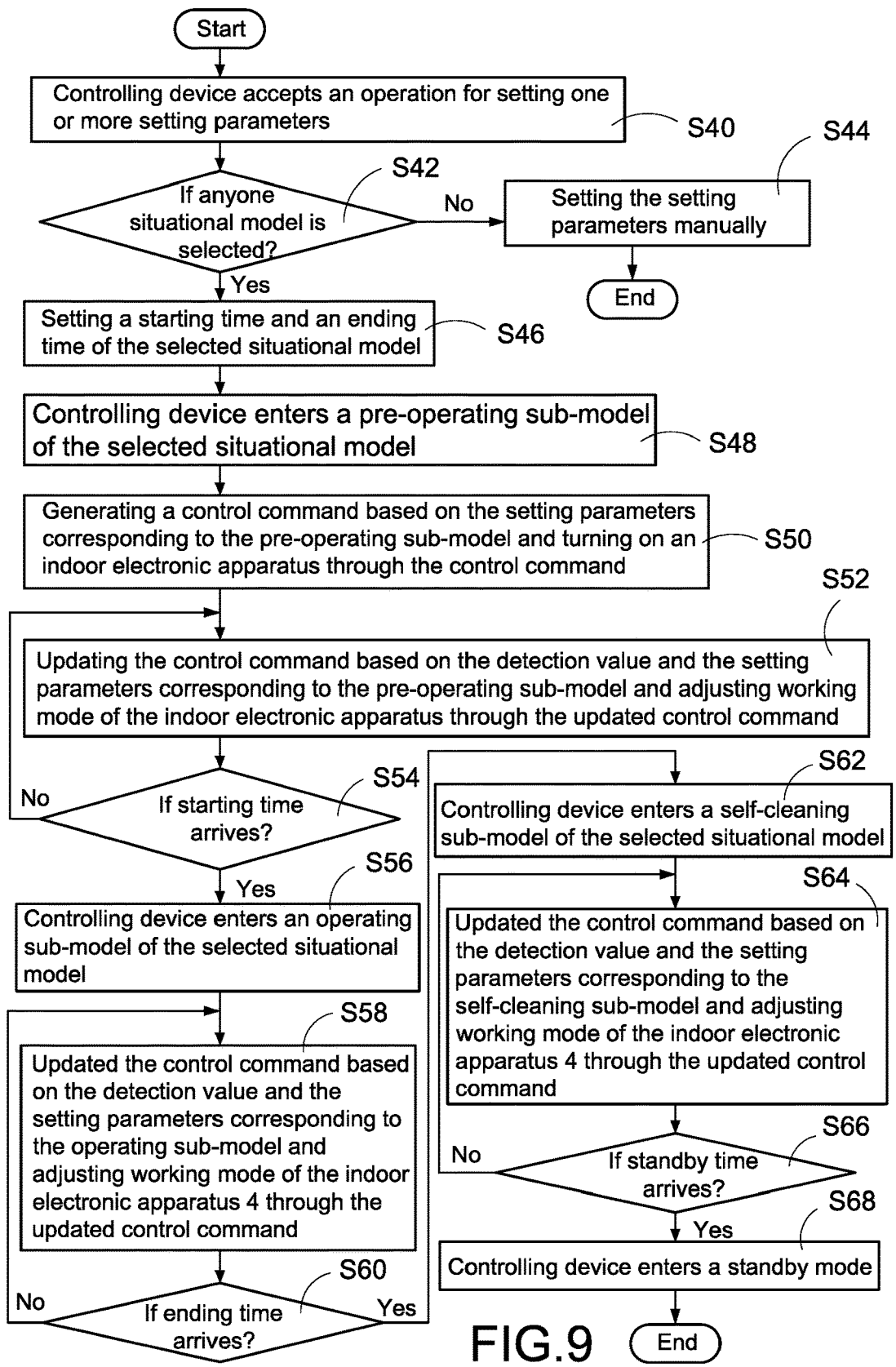
FIG. 9 is a flowchart of the situational model of a second embodiment according to the present invention.

FIG. 9 is a flowchart of the situational model of a second embodiment according to the present invention. FIG. 9 discloses a detailed flowchart according to the disclosure of FIG. 8. The controlling device 2 firstly accepts the operation of the supervisor 6 for setting the one or more setting parameters (step S40). In particular, the controlling device 2 determines if the supervisor 6 selects one of the plurality of situational models 272 or not (step S42). If the supervisor 6 doesn't select anyone of the plurality of situational models 272, it represents the setting parameters should be set by the supervisor 6 manually, so the controlling device 2 provides a corresponding setting menu (not shown) via the HMI 25, and receives the one or more setting parameters manually set by the supervisor 6 through the setting menu (step S44). Else, if any one of the plurality of situational models 272 is selected by the supervisor 6, the controlling device 2 applies the one or more setting parameters corresponding to the selected situational model 272 directly.

It should be mentioned that a routine detection is executed by the detection module 24 of the controlling device 2, and the plurality of slave detection devices 3 also continually execute the detection and keep an operative connection with the controlling device 2. Therefore, the controlling device 2 keeps receiving the detection value from the detection module 24 and/or the plurality of slave detection devices 3 in anytime at anywhere.

In this embodiment, the controlling device 2 executes the algorithm 271 to calculate the one or more setting parameters corresponding to the selected situational model 272 and generate the control command based on a calculating result, and the controlling device 2 transmits the generated control command to the wireless transmission controlling device 40 of the indoor electronic apparatus 4 to turn the indoor electronic apparatus 4 on. Following the lapse of time, the controlling device 2 receives the detection value continually, and the algorithm 271 updates the control command according to the setting parameters and the received detection value. The controlling device 2 transmits the updated control command to the wireless transmission controlling device 40 to adjust the working mode of the indoor electronic apparatus 4.

It should be mentioned is that more than one control commands with same efficiency may be generated by the algorithm 271 after calculation. In this situation, the algorithm 271 will select a most economical one as a preferred control command, or selects a best sensitive one as the preferred control command.

For instance, the controlling device 2 needs to turn on the indoor air circulator 43 and raise the compressor operating frequency greatly of an air conditioner in the meanwhile for reducing indoor temperature to 25 degree if only one indoor air circulator 43 is equipped, however, the controlling device 2 only needs to turn on all indoor air circulators 43 to reach the same target without greatly raising the compressor operating frequency of the air conditioner if five indoor air circulators 43 are equipped. The algorithm 271 will select the economical one to generate the control command, and operate the indoor electronic apparatus 4 to work in a corresponding mode based on the control command. The controlling method in the present invention brings at least three advantages at the same time: (1). satisfies the demand of the supervisor 6, (2). keeps the circumstance in a most comfortable status, and (3). works in a most economical result. Furthermore, the controlling method brings another advantage that doesn't need additional manual configuration by the supervisor 6 by way of the selection of the situational models 272.

In FIG. 9, the controlling device 2 receives the setting of the starting time and the ending time after the supervisor 6 completes selecting one of the plurality of situational models 272 (step S46). At a specific time before the starting time, the controlling device 2 enters the pre-operating sub-model of the selected situational model 272 (step S48.)

After entering the pre-operating sub-model, the controlling device 2 generates the control command based on the one or more setting parameters corresponding to the pre-operating sub-model, and turns on the indoor electronic apparatus 4 through the control command (step S50). For example, the control command may: (1). operates the indoor air conditioner 41 to turn on, to enter an air-conditioning mode, to set the temperature to 27 degree, to set the airflow to high airflow, and to turn on cleaning function; (2). operates the HRV 42 to turn on, to switch its operating mode based on CO2 quantity variation, and to set the ventilation flow to low ventilation flow; (3). operates the indoor air circulator 43 to turn on, and to set the airflow to high airflow; (4). operates the air purifier 44 to turn on, and to set the operating rate to middle operating rate.

During the pre-operating sub-model, the controlling device 2 continually receives the detection value, and updated the control command based on the detection value and the one or more setting parameters corresponding to the pre-operating sub-model, and adjusts the working mode of the indoor electronic apparatus 4 through the updated control command (step S52). For example, the updated control command may: (1). adjusts the compressor operating frequency based on the setting parameters, humidity value, temperature value, CO2 value, air dirty degree value and airflow value; (2). adjusts the operating mode and the airflow of the HRV 42 based on the setting parameters, humidity value, temperature value and CO2 value; (3). adjusts the operating rate of the indoor air circulator 43 based on the setting parameters, humidity value, temperature value and airflow value; (4). adjusts the operating rate of the air purifier 44 based on the setting parameters and air dirty degree value.

In the meanwhile, the controlling device 2 continually determines if the starting time arrives or not (step S54). If the starting time does not arrive yet, back to the step S52 and updates the control command continually. If the starting time arrives, the controlling device 2 enters the operating sub-model of the selected situational model 272 (step S56).

During the operating sub-model, the controlling device 2 continually receives the detection value, and updates the control command based on the detection value and the one or more setting parameters corresponding to the operating sub-model, and adjusts the working mode of the indoor electronic apparatus 4 through the updated control command (step S58). For example, the controlling device 2 can adjust the airflow of the indoor electronic apparatus 4 from high airflow to low airflow for reducing the noise, or determine the activity of people based on the lighting value and the radiant heat value and then adjust the compressor operating frequency according to the determined result.

In the meanwhile, the controlling device 2 continually determines if the ending time arrives or not (step S60). If the ending time does not arrive yet, back to the step S58 and updates the control command continually. If the ending time arrives, the controlling device 2 enters the self-cleaning sub-model of the selected situational model 272 (step S62).

During the self-cleaning sub-model, the controlling device 2 continually receives the detection value, and updated the control command based on the detection value and the one or more setting parameters corresponding to the self-cleaning sub-model, and adjusts the working mode of the indoor electronic apparatus 4 through the updated control command (step S64). For example, the controlling device 2 can switch the working mode of the HRV 42 to clean up the indoor unpleasant smell quickly. In the meanwhile, the controlling device 2 continually determines if the standby time arrives or not (step S66). If the standby time does not arrive yet, back to the step S64 and updates the control command continually. If the standby time arrives, the controlling device 2 enters the standby mode (step S68).

Figure 10:
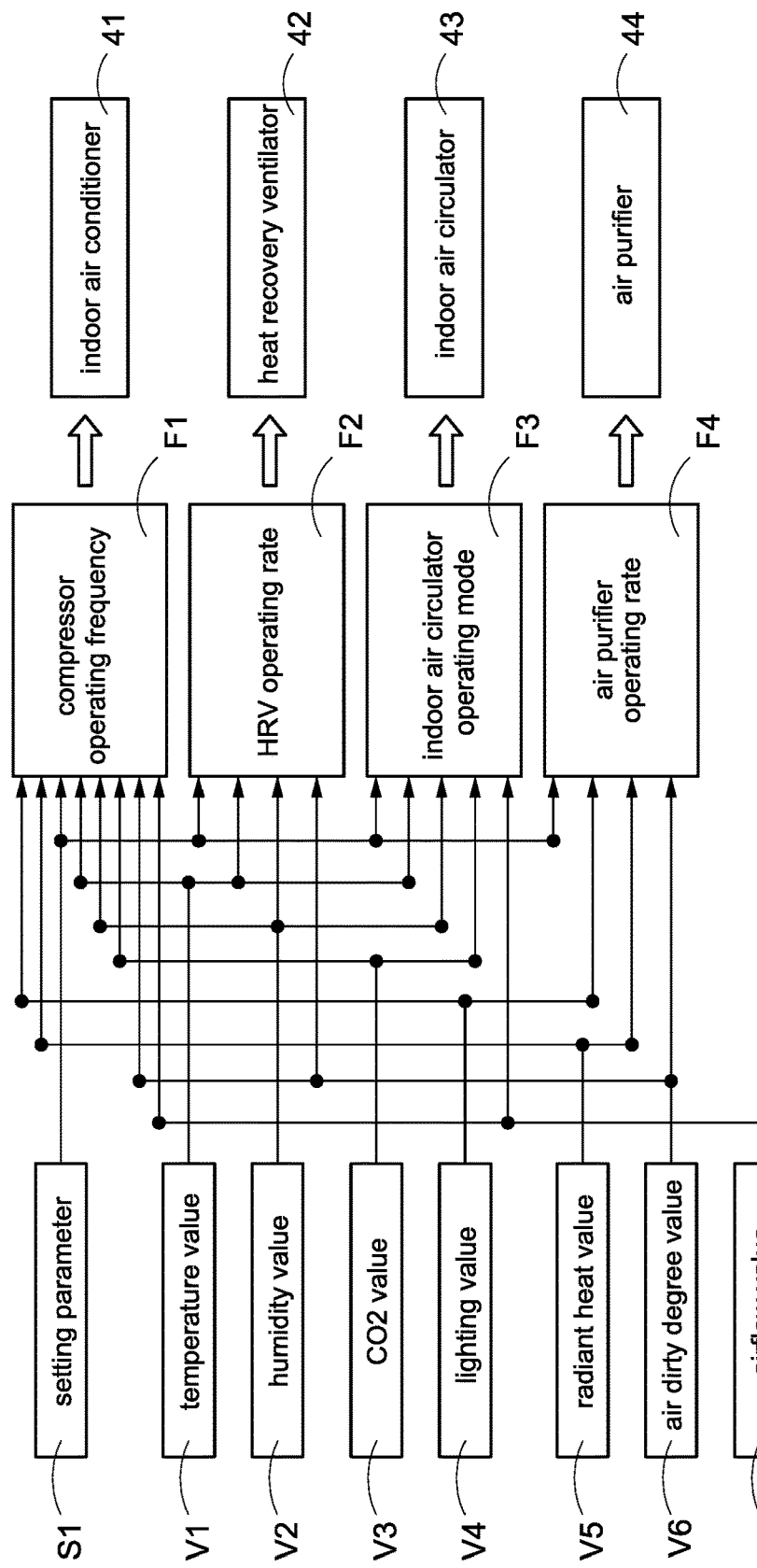
FIG. 10 is a perspective view of an algorithm of a first embodiment according to the present invention.

FIG. 10 is a perspective view of an algorithm of a first embodiment according to the present invention. The supervisor 6 in the present invention can do a manual input or a selection of the plurality of situational models 272 to set one or more setting parameters S1. The plurality of slave detection devices 3 and the detection module 24 provide multiple detection value, such as temperature value V1, humidity value V2, CO2 value V3, lighting value V4, radiant heat value V5, air dirty degree value V6, airflow value V7, etc. Depending on different amount and types of the indoor electronic apparatus 4, the algorithm 271 generates the control command with different content, in this embodiment, the control command mainly corresponds to a compressor operating frequency F1, an HRV operating rate F2, an indoor air circulator operating mode F3, an air purifier operating rate F4, etc., but not limited thereto.

In the embodiment shown in FIG. 10, the algorithm 271 calculates the compressor operating frequency F1 based on the setting parameters S1, the temperature value V1, the humidity value V2, the CO2 value V3, the lighting value V4, the radiant heat value V5, the air dirty degree value V6 and the airflow value V7, calculates the HRV operating rate F2 based on the setting parameters S1, the temperature value V1, the humidity value V2 and the air dirty degree value V6, calculates the indoor circulator operating mode F3 based on the setting parameters S1, the temperature value V1, the humidity value V2, the CO2 value V3 and the airflow value V7, and calculates the air purifier operating rate F4 based on the setting parameters S1, the lighting value V4, the radiant heat value V5 and the air dirty degree value V6. However, the above description is just a preferred embodiment, not intended to limit the scope of the present invention.

The controlling device 2 in the present invention can optimize the working mode of the indoor electronic apparatus 4 based on the content of the detection value under the standard set by the supervisor 6, therefore, the indoor electronic apparatus 4 can keep the circumstance in the most comfortable status, and the indoor electronic apparatus 4 can always work in the most economical way without violating the demand of the supervisor 6.

As the skilled person will appreciate, various changes and modifications can be made to the described embodiment. It is intended to include all such variations, modifications and equivalents which fall within the scope of the present invention, as defined in the accompanying claims.

What is claimed is:

1. A controlling method used in a controlling system which comprising a controlling device, a plurality of slave detection devices and a wireless transmission controlling device, wherein the wireless transmission controlling device being configured in an indoor electronic apparatus, the controlling method comprising following steps of:
   a) selecting one of a plurality of situational models at the controlling device, wherein each of the plurality of situational models respectively corresponding to a plurality of setting parameters;
   b) receiving wirelessly from the plurality of slave detection devices, a plurality of detection value being generated after each of the plurality of slave detection devices completing a circumstance condition detection;
   c) applying individually the plurality of setting parameters corresponding to the selected situational model to execute an algorithm, and the algorithm generating multiple control commands with a same efficiency after calculating the plurality of setting parameters, and selecting a most economical control command from the multiple generated control commands;
   d) transmitting the selected control command to the wireless transmission controlling device to turn the indoor electronic apparatus on;
   e) continually receiving wirelessly from the plurality of slave detection devices, the plurality of detection value generated by each of the slave detection devices while continually detecting a variation of a circumstance condition after the indoor electronic apparatus turned on; and
   f) updating the control command by the algorithm based on the plurality of setting parameters and the plurality of detection value simultaneously after the indoor electronic apparatus turned on, and transmitting the updated control command to the wireless transmission controlling device to adjust a working mode of the indoor electronic apparatus.

2. The controlling method according to claim 1, wherein the content of the control command comprises at least one of a turning on or turning off command, an operating rate adjustment, a compressor operating frequency adjustment, a temperature degree setting, an airflow setting and a working mode setting of the indoor electronic apparatus, and the indoor electronic apparatus comprises at least one of an indoor air conditioner, a heat recovery ventilator (HRV), an indoor air circulator, and an air purifier.

3. The controlling method according to claim 1, wherein the plurality of slave detection devices comprises at least one of a CO2 sensor, a temperature sensor, a humidity sensor, an IR sensor, a lighting sensor, an air-pressure sensor and an airflow sensor, and the detection value comprises at least one of CO2 value, temperature vale, humidity value, radiant heat value, lighting value, air dirty degree value and airflow value.

4. A controlling device comprises:
   a detection module for detecting a circumstance condition and generating a detection value;
   a human machine interface (HMI) for generating a plurality of setting parameters;
   a memory module storing a plurality of situational models, each of the plurality of situational models respectively corresponding to one or more of the plurality of setting parameters;
   a microprocessor electrically connected to the detection module, the HMI and the memory module, the microprocessor executing an algorithm, the algorithm generating multiple control commands with a same efficiency based on the plurality of setting parameters, and selecting a most economical control command from the multiple generated control commands;

a wireless transmission module electrically connected to the microprocessor, for transmitting the selected control command to an indoor electronic apparatus to turn on the indoor electronic apparatus, wherein, the detection module is configured to continually detect a variation of the circumstance condition for generating the detection value after the indoor electronic apparatus turned on, one of the plurality of situational models is selected, and the microprocessor individually applies the setting parameters corresponding to the selected situational model to generate the control commands, and continually updates the control command based on the detection value and the setting parameters corresponding to the selected situational model simultaneously for adjusting a working mode of the indoor electronic apparatus after the indoor electronic apparatus turned on.

5. The controlling device according to claim 4, wherein the detection module comprises at least one of a CO2 sensor, a temperature sensor, a humidity sensor, an IR sensor, a lighting sensor, an air-pressure sensor and an airflow sensor, and the detection value comprises at least one of CO2 value, temperature value, humidity value, radiant heat value, lighting value, air dirty degree value and airflow value.

6. The controlling device according to claim 4, wherein the wireless transmission module comprises at least one of Wi-Fi transmission module, Bluetooth transmission module, Zigbee transmission module and radio frequency (RF) transmission module.

7. The controlling device according to claim 4, wherein the selected situational model is a meeting model, the microprocessor generates the control command based on the plurality of setting parameters corresponding to the meeting model, and the content of the control command comprises turning an indoor air conditioner to an air conditioner mode and setting an airflow of the indoor air conditioner to low airflow, setting a recover frequency of a heat recovery ventilator (HRV) to low frequency and setting an airflow of the HRV to low airflow, and setting an airflow of an indoor air circulator to low airflow.

8. The controlling device according to claim 4, wherein the selected situational model is a luncheon model, the microprocessor generates the control command based on the plurality of setting parameters corresponding to the luncheon model, and the content of the control command comprises turning an indoor air conditioner to an air conditioner mode and setting an airflow of the indoor air conditioner to high airflow, setting a recover frequency of a heat recovery ventilator (HRV) to high frequency and setting an airflow of the HRV to high airflow, and setting an airflow of an indoor air circulator to high airflow.

9. The controlling device according to claim 4, wherein the content of the control command comprises at least one of a turning on or turning off command, an operating rate adjustment of the electronic apparatus, a compressor operating frequency adjustment, a temperature degree setting, an airflow setting and a working mode setting of the electronic apparatus.

10. A controlling system comprises:
a plurality of slave detection devices for detecting a circumstance condition and generating a detection value;

a controlling device for respectively receiving the detection value from the plurality of slave detection devices wireless and comprising:
a wireless transmission module for receiving the detection value;
a human machine interface (HMI) for generating a plurality of setting parameters;
a memory module storing a plurality of situational models, each of the plurality of situational models respectively corresponding to one or more of the plurality of setting parameters; and
a microprocessor electrically connected to the wireless transmission module, the HMI and the memory module, the microprocessor executing an algorithm, and the algorithm generating multiple control commands with a same efficiency based on the plurality of setting parameters, and selecting a most economical control command from the multiple generated control commands; and a wireless transmission controlling device configured in an indoor electronic apparatus, for receiving the selected control command wirelessly to transmit to the indoor electronic apparatus for turning on the indoor electronic apparatus;

wherein, the plurality of slave detection devices are respectively configured to continually detect a variation of the circumstance condition for generating the detection value after the indoor electronic apparatus turned on, one of the plurality of situational models is selected, and the microprocessor individually applies the setting parameters corresponding to the selected situational model to generate the control commands, and continually updates the control command based on the detection value and the setting parameters corresponding to the selected situational model simultaneously for adjusting a working mode of the indoor electronic apparatus after the indoor electronic apparatus turned on.

11. The controlling system according to claim 10, wherein each of the plurality of slave detection devices comprises:
at least one sensor for detecting the circumstance condition and generating the detection value;
a micro processing unit electrically connected to the at least one sensor; and
a wireless transmission unit electrically connected to the micro processing unit, for connecting with the controlling device and transmitting the detection value to the controlling device.

12. The controlling system according to claim 11, wherein the at least one sensor comprises at least one of a CO2 sensor, a temperature sensor, a humidity sensor, an IR sensor, a lighting sensor, an air-pressure sensor and an airflow sensor, and the detection value comprises at least one of CO2 value, temperature value, humidity value, radiant heat value, lighting value, air dirty degree value, and airflow value.

13. The controlling system according to claim 10, wherein the content of the control command comprises at least one of a turning on or turning off command, an operating rate adjustment, a compressor operating frequency adjustment, a temperature degree setting, an airflow setting and a working mode setting of the indoor electronic apparatus, and the indoor electronic apparatus comprises at least one of an indoor air conditioner, a heat recovery ventilator (HRV), an indoor air circulator and an air purifier.

14. The controlling system according to claim 10, wherein the controlling device comprises at least one detection module electrically connected to the microprocessor, the detection module detects the circumstance condition and generates the detection value, wherein the at least one detection module comprises at least one of a CO2 sensor, a temperature sensor, a humidity sensor, an IR sensor, a lighting sensor, an air-pressure sensor and an airflow sensor.

* * * * *